(12) United States Patent
Chen et al.

(10) Patent No.: US 8,689,874 B2
(45) Date of Patent: Apr. 8, 2014

(54) VISCO-ELASTIC SURFACTANT SPACERS

(75) Inventors: Yiyan Chen, Sugar Land, TX (US); Jesse Lee, Paris (FR); Bruno Drochon, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 453 days.

(21) Appl. No.: 12/808,308

(22) PCT Filed: Dec. 23, 2008

(86) PCT No.: PCT/EP2008/011090
§ 371 (c)(1),
(2), (4) Date: Sep. 21, 2010

(87) PCT Pub. No.: WO2009/083237
PCT Pub. Date: Jul. 9, 2009

(65) Prior Publication Data
US 2011/0024113 A1 Feb. 3, 2011

(30) Foreign Application Priority Data

Dec. 28, 2007 (EP) ..................................... 07150480

(51) Int. Cl.
*E21B 43/16* (2006.01)
*E21B 33/00* (2006.01)
*E21B 21/00* (2006.01)

(52) U.S. Cl.
USPC ......................... 166/305.1; 166/285; 166/312

(58) Field of Classification Search
None
See application file for complete search history.

(56) References Cited

U.S. PATENT DOCUMENTS

| 6,435,277 | B1 | 8/2002 | Qu et al. | |
|---|---|---|---|---|
| 6,482,866 | B1 | 11/2002 | Dahayanake et al. | |
| 2003/0221832 | A1* | 12/2003 | Reddy et al. | 166/300 |
| 2003/0236174 | A1* | 12/2003 | Fu et al. | 507/200 |
| 2006/0229231 | A1* | 10/2006 | Chen et al. | 510/499 |

FOREIGN PATENT DOCUMENTS

| RU | 2198906 | 2/2003 |
|---|---|---|
| RU | 2217585 | 11/2003 |
| WO | 2004/057155 | 7/2004 |
| WO | 2005/014975 | 2/2005 |
| WO | 2007/119211 | 10/2007 |

OTHER PUBLICATIONS

Expanding Applications for Viscoleastic Surfactants', Oilfield Review Winter 2004/2005.
Decision on grant for the equivalent Russian patent application No. 2010131627 issued on Apr. 12, 2013.

* cited by examiner

*Primary Examiner* — Angela M DiTrani
(74) *Attorney, Agent, or Firm* — Michael Dae

(57) ABSTRACT

A spacer for use in an oil well cementing operation comprises an aqueous solution of a visco-elastic surfactant. A method of treating a well in a cementing operation comprises pumping the spacer into a well ahead of a cement slurry, thereby minimizing or preventing commingling of drilling fluid and the cement slurry.

6 Claims, 2 Drawing Sheets

VISCO-ELASTIC SURFACTANT SPACERS

TECHNICAL FIELD

This invention relates to spacers that are used in cementing operations in oil and gas wells and the like. In particular, the invention relates to the use of visco-elastic surfactants.

BACKGROUND ART

When wells such as oil and gas wells are drilled, a drilling fluid, commonly known as 'mud' is circulated through the well to assist in removing drilled material, to stabilise the wall of the well and to balance the pressure of fluids in the formation through the well. At various points during the drilling of the well, and once the well drilling is completed, casings are typically cemented in the well. This is achieved by positioning the casing in the well and pumping a cement slurry down the casing from the surface and back up the annulus between the casing and the wall of the well where it is allowed to set to support the casing and provide zonal isolation.

In cementing operations, drilling mud remaining in the well needs to be cleaned up before pumping cement to improve the bonding of cement to casing and wellbore. The cleanup is typically done by pumping a chemical wash with surfactant solutions through the well. Following this a spacer is pumped through the well to displace the mud ahead of the cement slurry. The spacer needs to have a proper rheology profile to displace the mud and chemical wash fluid and carry particles remaining in the well. Since the spacer comes into contact with both the mud and cement, it needs to have some compatibility with both materials. For the mud side, the spacer fluid should be compatible with the mud particles, brine and solvents. For cement side, the fluid should be able to tolerate high pH, calcium and other cementing additives. By itself, the spacer also needs to be able to be weighted with brines or solid weighting agents to maintain the hydrostatic pressure in the well.

Visco-elastic surfactants (VES) have previously been proposed for well treatment fluids, particularly in the field of fracturing. They have also been proposed for other uses involving the controlled transport of particulate materials. Examples of such proposed uses can be found in U.S. Pat. No. 6,435,277; U.S. Pat. No. 6,482,866; WO 2005/014975 and WO 2007/119211 which discloses additives for viscoelastic surfactant fluids and oilfield treatment methods comprising the injection of a viscoelastic surfactant, a poly-ethyleneglycol-propyleneglycol block copolymer and polynapthalene sulfonate. Further aspects of the use of visco-elastic surfactants can be found in 'Expanding Applications for Viscoleastic Surfactants', Oilfield Review Winter 2004/2005.

WO2004/057155 describes a method for fracturing a subterranean formation comprising injection of an aqueous fluid comprising a viscoelastic surfactant and a polymer additive.

US2003/221832 discloses a spacer fluid for use between a hydraulic cement slurry and a drilling fluid. However, no use of a viscoelastic fluid is mentioned.

DISCLOSURE OF THE INVENTION

A first aspect of this invention provides a spacer for use in an oil well cementing operation, comprising an aqueous solution of a visco-elastic surfactant.

The visco-elastic surfactant can comprise a zwitterionic surfactant that is typically present in an amount of less than 5%. In a preferred embodiment, the zwitterionic surfactant has the betaine structure

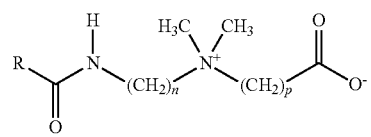

wherein R is a hydrocarbon group that may be branched or straight chained, aromatic, aliphatic or olefinic and has from 14 to 26 carbon atoms and, optionally contains an amine; n=2 to 4; and p=1 to 5; and mixtures thereof.

The visco-elastic surfactant can also comprise an amphiphilic polymer as a rheology enhancer. The rheology enhancer can comprise a block copolymer of polypropylene glycol and polyethylene glycol; and a polynaphthalene sulphonate. The rheology enhancer is typically present in an amount of less than 0.02%.

Further components can be added for controlling the density of the spacer to a predetermined level, for example heavy brine such as calcium bromide and/or calcium chloride.

The spacer can further comprise a co-surfactant.

A second aspect of the invention provides a method of treating a well in a cementing operation, comprising pumping a spacer according to the first aspect of the invention into a well ahead of a cement slurry for cementing the well.

The spacer can either be preceded by a chemical wash or can be pumped into the well with no chemical wash preceding the spacer.

Preferably, the cement slurry immediately follows the spacer.

The spacer can be batch mixed or mixed on the fly and may be foamed or unfoamed.

Further aspects of the invention will be apparent from the following description.

MODE(S) FOR CARRYING OUT THE INVENTION

One particularly preferred embodiment of the invention can be based on current VES fracturing formulations using a zwitterionic surfactant and an amphiphilic polymer. The zwitterionic surfactant can comprise a betaine structure

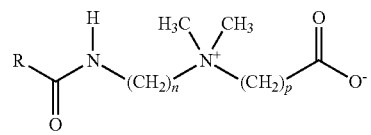

wherein R is a hydrocarbon group that may be branched or straight chained, aromatic, aliphatic or olefinic and has from 14 to 26 carbon atoms and, optionally contains an amine; n=2 to 4; and p=1 to 5; and mixtures thereof. Particularly preferred forms of such betaines are R=$C_{17}H_{33}$, n=3, and p=1 (BET-O-30); and R=$C_{21}H_{41}$, n=3, and p=1 (BET-E-40).

The amphiphilic polymer acts as a rheology enhancer and can comprise a first component of a block copolymer of polypropylene glycol and polyethylene glycol; and a second component as a polynaphthalene sulphonate.

Figure 1:
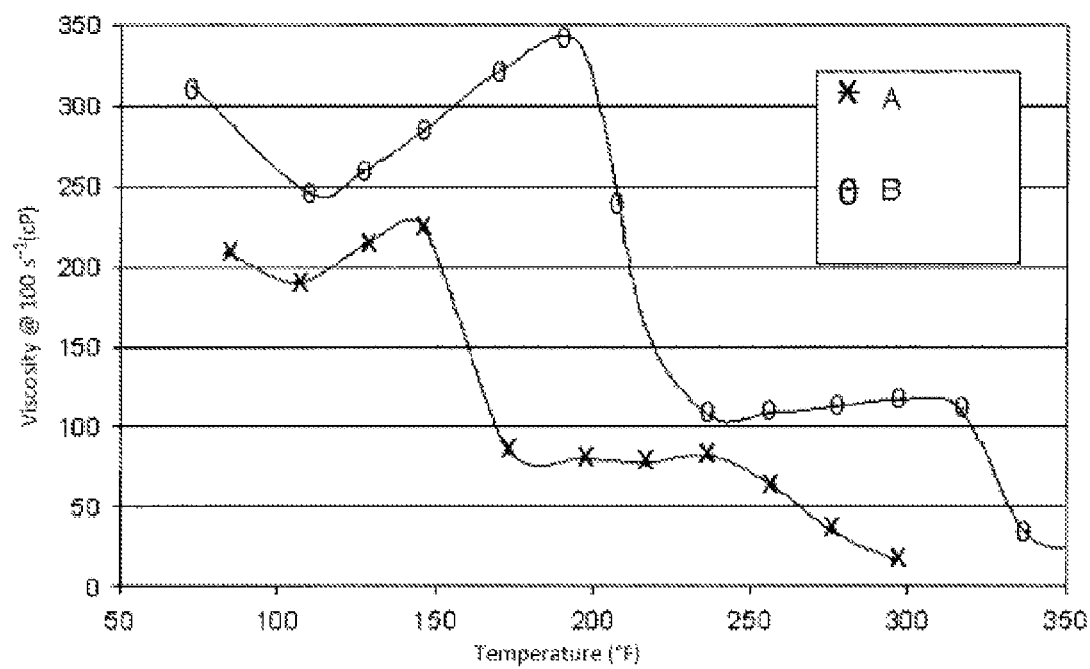
FIG. 1 shows a plot of viscosity vs temperature for an embodiment of the invention alone and in the presence of a density regulator.
Figure 2:
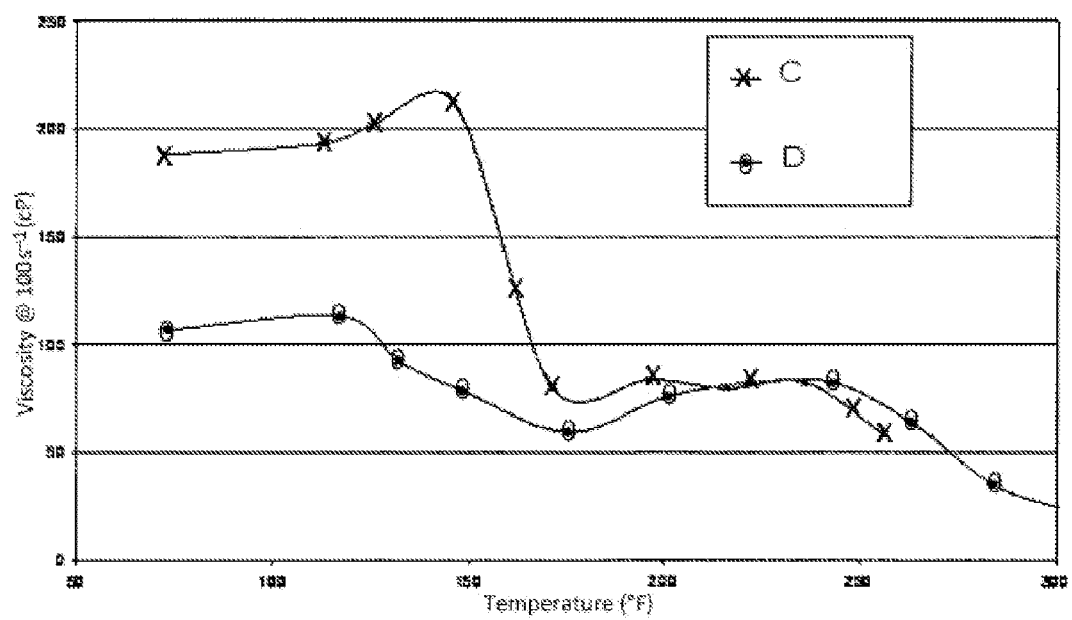
FIG. 2 shows a plot of viscosity vs temperature for an embodiment of the invention at different pH.

This formulation can provide a VES fluid which can be used as cementing spacer fluid. This fluid formulation can be used to gel heavy brines and so meets the requirement for pressure control in the well and other density requirements. FIG. 1 shows a plot of viscosity vs temperature for two applications for a formulation according to an embodiment of the invention. In both cases, the formulation comprises a solution of 4.5% of zwitterionic surfactant and 0.015% of amphiphilic polymer. Line A shows the viscosity behaviour on changing temperature. Line B shows the corresponding plot to line A in a 13 ppg (1557.75 kg/m$^3$) solution that includes calcium bromide and calcium chloride as density regulators. As shown can be seen from FIG. 1, the fluid has good rheology in heavy brine. This formulation is also stable in a basic environment (high pH), as shown in FIG. 2 in which line C shows viscosity vs temperature behaviour at pH10 and line D the corresponding behaviour at pH 12. This provides the opportunity to retain the gel strength in the spacer when in contact with cement. The formulation is also tolerant to a certain concentration of cementing dispersant such as Daxad.

Addition of the amphiphilic polymer allows the fluid to have good shear recovery even at very low surfactant concentrations (in the examples given above, the surfactant is present at a level of less than 5%). This gives the opportunity to use the spacer fluid at low surfactant concentration and so provide a lower cost solution over a range of temperatures.

As well as the properties that allow the formulation of the invention to be used as spacer, the presence of the surfactant fluid means that it can also be formulated to provide a chemical wash function to clean up the surface of the wellbore and casing to achieve better bonding. One embodiment of the invention comprises a single fluid doing the job of both the chemical wash and the spacer to simplify job operation and further save cost.

Unlike cationic or anionic surfactants, the zwitterionic surfactant also provides increased oil tolerance. This oil tolerance cab be enhanced by the use of co-surfactants which allows the spacer to maintain viscosity while in contact with oil based mud.

In use, the spacer can be prepared at the surface by batch mixing followed by pumping downhole, or by on the fly mixing as it is pumped downhole. It can be prepared in a foamed or unfoamed format according to requirements.

Other changes within the scope of the invention will be apparent.

The invention claimed is:

1. A method of treating a well in a cementing operation comprising pumping a spacer comprising an aqueous solution of calcium chloride, calcium bromide or both, a zwitterionic visco-elastic surfactant and an amphiphilic polymer into a well ahead of a cement slurry for cementing the well, wherein the visco-elastic surfactant concentration is lower than 5% by weight of the spacer, wherein the fluid pH is between 10 and 12, wherein the visco-elastic surfactant has a betaine structure:

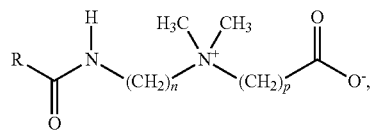

wherein R is a hydrocarbon group that may be branched or straight chained, aromatic, aliphatic or olefinic and has from 14 to 26 carbon atoms; n=2 to 4; and p=1 to 5, and mixtures thereof.

2. The method as in claim 1, wherein the cement slurry immediately follows the spacer.

3. The method as in claim 1, wherein the spacer is batch mixed prior to pumping into the well or mixed on the fly during pumping into the well.

4. The method as in claim 1, wherein the spacer is foamed or unfoamed.

5. A method for cementing a well comprising pumping a spacer comprising an aqueous solution of calcium chloride, calcium bromide or both, a zwitterionic visco-elastic surfactant and an amphiphilic polymer into a well; then pumping a cement slurry and letting the cement slurry harden, wherein the visco-elastic surfactant concentration is lower than 5% by weight of the spacer, wherein the fluid pH is between 10 and 12, wherein the visco-elastic surfactant has a betaine structure:

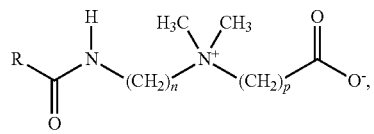

wherein R is a hydrocarbon group that may be branched or straight chained, aromatic, aliphatic or olefinic and has from 14 to 26 carbon atoms; n=2 to 4; and p=1 to 5, and mixtures thereof.

6. The method as in claim 5, wherein the cement slurry immediately follows the spacer.

* * * * *